United States Patent Office 3,598,623
Patented Aug. 10, 1971

3,598,623
CARBOXYL STARCH AMINE ETHERS AND PAPER COATING COMPOSITIONS CONTAINING SAME
Robert M. Powers and Roland W. Best, Decatur, Ill., assignors to A. E. Staley Manufacturing Company, Decatur, Ill.
No Drawing. Filed Apr. 24, 1968, Ser. No. 723,883
Int. Cl. C08b 25/02; D21h 1/24
U.S. Cl. 106—214     14 Claims

ABSTRACT OF THE DISCLOSURE

Carboxyl starch amine ethers having an anionic substituent-to-amine-ether substituent molar ratio of at least 1:1 and paper coating colors containing the carboxyl starch amine ethers as high-strength binders, especially for low weight publication-grade paper.

DISCLOSURE OF INVENTION

This invention relates to a novel class of carboxyl starch amine derivatives and more particularly to carboxyl starch amine ethers having properties rendering them excellently adapted for use as pigment binders in paper coating formulations. The invention also relates to paper coating compositions comprising pigments and the carboxyl starch amine ether binders, the use of the paper coating formulations in preparing coated paper products, and the resultant coated paper products.

It will be understood that the phrase "carboxyl starch amine ether" as employed herein refers to starches containing ionizable carboxyl (—$CO_2H$) groups and includes starches wherein the carboxyl radicals are formed from carbon atoms in the nucleus of starch anhydroglucose units (e.g. oxidized starches), as well as starches wherein the carboxyl radicals are substituents of radicals attached exteriorly to starch anhydroglucose units (e.g. carboxyalkyl starch ethers). It further will be understood that the term "carboxyl starch amine ether" embraces starches wherein carboxyl is the sole anionic group present as well as those containing, in addition to carboxyl groups, other anionic groups (e.g. the phosphate groups naturally found in raw potato starch, —$SO_4H$, —$SO_3H$, and the like) in an amount which is minor with regard to the carboxyl substituent molar content of the starch.

Paper commonly is surface coated with a pigment, such as clay, titanium dioxide, and the like, in order to improve one or more of its properties. Feel, optical characteristics (e.g. opacity, gloss, and brightness), and receptivity to printing are typical characteristics desired to be improved in the coating treatment. Since conventional pigments do not have an affinity for the cellulose fibers of paper, a binder for the pigment is incorporated into the coating composition. The coating operation is accomplished by applying to the paper surface the pigment-binder combination in the form of an aqueous dispersion (commonly known as a coating color) and drying the resultant treated paper.

As would be expected, the more suitable binders employed in commercial coating colors are those which provide coated papers of given standards at the lowest relative raw material and operating costs. Due to the relatively low expenditures attendant to its use, starch is the most commonly employed paper coating pigment binder. To provide suitable coating strength, however, starch is required to be employed at relatively high binder levels and, hence, contributes significantly to the total weight of the coated paper.

Since the magnitude of handling and shipping costs (e.g. postage) of coated paper products depends upon weight, techniques have been sought, particularly in the case of coated paper used in large circulation periodicals, to reduce such costs through a reduction in the weight of coating material applied. Merely reducing the starch binder content of conventional coating colors does not provide desirable results in that the strength of the coating correspondingly is diminished. The weight reduction problem further is aggravated by the fact that to retain given opacity, brightness, and printing characteristics, pigment levels of particular coatings must be maintained at certain minimum levels. This necessitates that any reduction in total coating weight in given applications be accomplished by a lowering of the binder content.

One method which has been suggested for preparing low weight paper involves the use of higher strength non-starch binders. This approach has limited appeal, however, due to the relatively high raw material cost of non-starch binders. Another suggested approach employs positively charged starches, exemplified by the cationic starches described in U.S. Pats. Nos. 3,052,561 and 3,320,080. This approach, however, also has not proven totally acceptable. The development of practically effective binding strength in such starches requires the starch be relatively highly derivatized by the introduction of amine substituents. This relatively high derivatization, in turn, causes such positively charged starches to form, when combined with pigments in the preparation of the more desirable high pigment content coating colors, extremely viscous non-homogeneous mixtures (a phenomenon known as "shock") which must be subjected to long and vigorous agitation (working) to be useable. The search in the art, therefore, has continued for means to economically produce low starch binder content paper coatings of acceptable properties.

It is therefore the primary object of the present invention to provide starch derivatives having properties advantageously rendering them useful as binders in the production of improved paper coating compositions.

It is another object of the present invention to provide starch derivatives which are readily formulatable with paper coating pigments to produce coating colors useful in the preparation of economically feasible low binder content paper coatings of satisfacotry strength, optical properties, and printability.

It is another object of the present invention to provide a paper coating composition having improved properties.

A particular object of the present invention is to provide a paper coating composition having a relatively low starch binder-to-pigment ratio which is capble of producing coated paper products of excellent strength, opacity, brightness, and printing qualities.

These and other objects of the invention will be apparent from the following detailed description.

Broadly described, the high strength pigment binder starch of the invention is a carboxyl starch amine ether selected from the group consisting of carboxyl starch ethers containing tertiary amine ether groups and carboxyl starch ethers containing quaternary amine ether groups, said carboxyl starch amine ether having an anionic substituent-to-amine-ether substituent molar ratio of at least 1:1, preferably in the range of from about 1.1:1 to about 3:1, and having an average of from about 0.75 to about 5 amine ether substituents per 100 anhydroglucose units, i.e. an amine ether substituent degree of substitution (D.S.) of from about 0.0075 to about 0.05.

Typical carboxyl starch amine derivatives of the invention may be represented by one of the following general structural formulas:

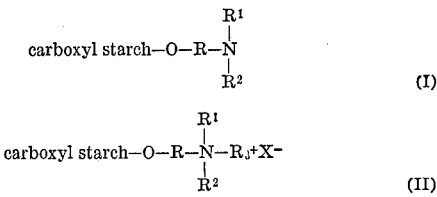

wherein R is selected from the group consisting of alkylene and hydroxyalkylene radicals having from 1 to 5 carbon atoms; X is a halogen ion; and wherein either (1) each of $R^1$, $R^2$, and $R^3$ is independently selected from the group consisting of alkyl of up to 12 carbon atoms, cyclohexyl, phenyl, and benzyl, such that
  (a) when any two of $R^1$, $R^2$, and $R^3$ are the same, none of $R^1$, $R^2$, and $R^3$ contains more than 6 carbon atoms, and
  (b) when any two of $R^1$, $R^2$, and $R^3$ contain more than 6 carbon atoms, any remaining radical of $R^1$, R2, and R3 is alkyl of up to two carbon atoms; or
(2) two of $R^1$, $R^2$, and $R^3$ form, with the nitrogen atom to which they are attached, a heterocyclic radical selected from the group consisting of morpholinyl, piperidyl, and pyrrolidyl radicals having up to one alkyl ring substituent of up to two carbon atoms, with any remaining radical of $R^1$, $R^2$, and $R^3$ being alkyl of up to four carbon atoms.

It will be apparent that the Formula I represents embodiments of the carboxyl starch amine ethers of the invention containing tertiary amine ether groups, and Formula II, embodiments containing quaternary amine (ammonium) ether groups.

As measured by the acid-wash method described in Analytical Chemistry 19, pages 24–27 (1947), the carboxyl starch amine ethers of the invention have a total anionic substituent content, calculated as carboxyl, dry substance weight basis (hereinafter referred to as carboxyl equivalent content), of at least about 0.3%, and generally in the range of from about 0.3 to about 3%. Carboxyl equivalent contents of greater than about 3% are suitable but are, due to difficulties generally encountered in product recovery stemming from soluble losses, less preferred. Binder properties are improved with increased carboxyl equivalent content; consequently, the preferred embodiments of the carboxyl starch amine ethers of the invention have carboxyl equivalent contents of at least about 0.5% and in the range of from about 0.5% to about 1.5%. The preferred embodiments of the starch binder of the invention have, in addition, an amine ether substituent D.S. in the range of from about 0.01 to about 0.035. Amine substitution corresponding to the upper end of this range actually is unnecessary, though, since amine ether substitution to a D.S. in the range of 0.015 to about 0.025 results in the maximum degree of binding strength which can be imparted to a derivative of the present invention by amine substituent introduction.

In another broad aspect, the invention constitutes a paper coating composition comprising an aqueous dispersion of a pigment and a starch binder for said pigment, at least a portion of said starch binder being at least one carboxyl starch amine ether of the above-described type.

In other broad aspects the present invention constitutes an improved method for coating paper and the resultant coated paper.

The carboxyl starch amine ethers of the present invention advantageously have improved pigment binding strength as compared to conventional carboxyl starches, e.g. the pick resistance of coatings prepared using them is higher. The superior binding strength of the carboxyl starch amine ethers of the present invention permits coatings of a desired strength to be produced from given pigments at lower binder-to-pigment levels and consequently advantageously provides a means for producing lower weight papers. The improvement in coating strength observed using relative low levels of binder, moreover, is achieved without any sacrifice, and in preferred embodiments significant improvement, in other desirable properties of the coated papers such as the opacity, brightness, gloss, and printability. With regard to the latter, unexpected improvements in ink hold-out, drying speed, and the like have been observed with coated paper prepared using certain preferred embodiments of the binder starches of the invention. Also important is the fact that the pasted form of these high strength binder starches are easily dispersible and readily formulatable with pigments, in coating colors even at high total solids.

The carboxyl starches of the invention, while they bear amine ether constituents, are distinct from starch amine ethers described in the prior art. Prior art starch amine ethers, exemplified by those described in U.S. Pat. No. 3,052,561, unless hydrolyzed by treatment with conventional starch thinning agents such as acids and enzymes generally have high paste viscosities themselves and, in any event, as stated above, when used to prepare coating colors, require vigorous mixing to be utilized to overcome a characteristic initial high viscosity rise evidencing shock of the pigment dispersion. In contrast to such prior art starch amine ethers, the preferred carboxyl starch amine ethers of the present invention (i.e. hypochlorite oxidized starch amine ethers) have paste viscosity characteristics similar to conventional thinned (e.g. oxidized and acid-hydrolyzed) starches and are easily dispersible and formulatable with pigments in aqueous media to provide shock-free, stable, homogeneous dispersions. Moreover, identifying features of prior art starch amine ethers are migration to the cathode in an electrophoretic cell (at neutral pH conditions) and an ability to strongly sorb dyes, such as Light Green SF dye. The carboxyl starch amine ethers of the invention, in direct contrast, fail to sorb such dyes to any greater extent than unmodified starches, and migrate under such pH conditions in an electrophoretic cell, if at all, toward the anode.

Similarly, although the starch amine ethers of the invention contain carboxyl substituents, they have properties which could not be predicted based on prior knowledge of carboxyl starches. For example, while conventional carboxyl starches (e.g. hypochlorite-oxidized starches) are known to demonstrate decreasing pigment binding strength with increasing carboxyl content, the corresponding carboxyl starch amine ethers of the present invention, such as those containing carboxyl groups introduced by hypochlorite-oxidation, surprisingly exhibit just the opposite characteristic—increasing binder strength (at given amine substituent levels) with increasing carboxyl content. This feature of the starches of the invention advantageously allows the development of significant pigment binding power in starch even at relatively low amine substituent levels. Hence, it surprisingly was found that, in the production of the binder starches of the present invention, not only could materials be produced which have better viscosity and pigment-compatibility properties as compared to prior art starch amine, but products having corresponding binding power could be produced more cheaply, since a portion of the binder strength-developing treatment heretofore requiring the use of amine-containing etherification reagents could be replaced by a much simpler and less expensive treatment, e.g. hypochlorite oxidation.

The carboxyl starch amine ethers of the invention may be prepared by appropriate use of conventional reactions, usually using aqueous reaction media, known to introduce carboxyl groups and amine ether substituents into a starting starch having reactive hydroxyl groups. Provided unsatisfactory destruction of desired functional groups already present does not occur, the carboxylation and amine-introducing etherification reactions can be carried out in any sequence, even simultaneously. While introduction of either of the desired types of functional groups usually is effected in one stage, the use of separate stages, such as completing carboxylation after introducing amine ether substituents into a partially carboxylated intermediate, is also suitable. Conventional reactions can be employed using particular modifying agents, with the reaction being terminated when the desired degree of conversion is attained. Progress of the reaction may be followed by known methods, e.g. qualitative analysis for modifying agent, qualitative analysis of product (carboxyl group or nitrogen content), or measurement of product dye adsorption or electrophoretic migration. Non-gelatinizing temperature and pH reaction conditions preferably are employed in the reactions to yield granular starch products which can be recovered by simple methods, such as filtration. Where gelatinizing conditions are employed, the resultant products can be recovered in dried form by roll drying and similar conventional recovery techniques.

With regard to specific techniques which can be used for the carboxylation step in preparing the carboxyl starch amine ethers of the invention, a wide variety of methods are available. One especially useful method is the hypochlorite oxidation of starch in which granular starch is warmed in aqueous alkaline bleach and then neutralized. The reaction typically involves reacting an aqueous starch suspension having a pH of 7.5 to 10.5 for about 1.5 to about 2.5 hours with an alkali hypochlorite (e.g. sodium or calcium hypochlorite) at 100°–130° F., the amount of hypochlorite added supplying from about 2.5 to about 8% available chlorine, based on the starch dry weight, dependent upon the nature of the starch being treated and the degree of modification desired. Potato starch, for example, requires less hypochlorite reactant than corn starch to provide carboxyl starches of equivalent carboxyl content. At the conclusion of the reaction the suspension usually is neutralized to a pH of from about 4 to about 8. The hypochlorite treatment oxidizes a portion of the carbon atoms of the starch molecule bearing hydroxyl groups to carboxyl radicals.

Another method of preparing modified starch containing carboxyl groups is disclosed in U.S. Pat. No. 3,071,573. This method comprises reacting granular starch in the presence of water and an alkaline catalyst with an etherifying agent such as the lower alkyl (e.g. methyl) esters of crotonic, itaconic, and acrylic acids. This process introduces sodium carboxyalkyl ether substituents into the starch molecule. Subsequent neutralization of the product with acid converts it to a substance containing reactive carboxyl groups.

Additional methods of introducing carboxyl group into starch in the form of carboxyalkyl groups are available. Examples appear in U.S. Pats. Nos. 2,660,577 and 2,654,736, which disclose the reaction of starch with a beta- or gamma-lactone, and U.S. Pat. No. 2,773,057 which describes reacting granular starch with a monochlorine-substituted saturated fatty-acid salt, such as sodium chloroacetate.

Still another method for preparing carboxyl starch produces what is referred to as dicarboxyl starch. In this method, exemplified in U.S. Pat. No. 2,894,945, a periodate-oxidized starch containing dialdehyde groups is treated with a water-soluble inorganic salt of chloric acid to oxidize the dialdehyde groups.

While suitable carboxyl starches result from any of the above-described modifications, the generally preferred carboxyl starch derivatives of the invention are granular hypochlorite-oxidized starches. The preparation of these starches is relatively inexpensive, and they generally have better color (whiteness) compared to other carboxyl starches.

Introduction of the amine ether substituents of the carboxyl starch derivatives of the present invention, in general, is accomplished by reacting starch in an alkaline aqueous medium with an etherifying reagent containing a tertiary or quaternary amine substituent. Typical amine etherifying agents are exemplified by tertiary and quaternary amines containing a halo- or epoxy-substituted, and preferably terminated, aliphatic (e.g. alkyl or alkenyl) group reactive with the hydroxyl group of the starch molecule.

The reaction suitably may be carried out under gelatinizing pH and temperature conditions, but, as stated above, for ease of product handling and recovery, the preferred techniques employ granular starch feeds and non-gelatinizing reaction conditions. In a typical preparation of granular derivatives, an aqueous slurry of the starting granular starch and an aqueous solution of alkali, such as sodium hydroxide, and amine etherification reagent are mixed together. Depending upon the degree of substitution of the ultimate product and the reaction efficiency of the amine etherification reagent, the amount of amine etherification reagent employed generally falls in the range of from about 1% to about 10% by weight of the starch reactant, dry substance basis. The amount of alkali added in particular embodiments is that necessary to adjust the pH of the medium to about 10–11.5. The resultant reaction mixture then is maintained at a temperature in the range of from about 75° F. to 120° F. for a time period sufficient for the desired degree of etherification to be accomplished. Normal reaction periods are on the order of 16–24 hours. After the reaction medium is neutralized or acidified (the amine salt being formed in the latter step), the resultant granular starch derivative can be recovered by filtration, washed with water, and then dried.

Specific etherifying reactants which can be employed to prepare the present derivatives containing tertiary amine either substituents include dialkyl amine alkyl epoxides, dialkyl amine alkyl halides, the aryl and heterocyclic amine counterparts thereof and the hydrohalides of such tertiary amines such as 3-dibutylamino-1,2-epoxy-propane, N-(2,3-epoxy-propyl) piperidine, N-(2,3-epoxypropyl)-N-methyl aniline, 2-bromo-5-diethylamino pentane hydrobromide, beta-diethylamino ethyl chloride, beta-dimethylamino isopropyl chloride, and beta-dimethylamino ethyl chloride. Additional examples of etherifying agents and a more detailed preparation procedure for introducing tertiary amine ether substituents into the derivatives of the present invention are disclosed in U.S. Pat. No. 2,813,093.

The preparation of tertiary amine ether substituent containing carboxyl starches, in some instances, may require that the sequence of reactions employed in the synthesis be given special consideration. For example, tertiary amine groups are relatively unstable under conditions employed to carboxylate starch by oxidation. Hence, when oxidation is employed in the preparation of carboxyl starch tertiary amine ethers, it is desirable to oxidize the starch first and then treat the oxidized starch intermediate with a tertiary amine etherifying agent.

Specific etherifying reagents which can be employed to introduce quaternary amine ether substituents into the derivatives of the present invention include epihalohydrin-free reaction products of epihalohydrins (e.g. epichlorohydrin or epibromohydrin) and tertiary amines or tertiary amine hydrohalides, such as trimethyl amine, triethyl amine, trimethyl amine hydrochloride, triethyl amine hydrobromide, N,N-dimethyl dodecyl amine, N,N-dimethyl cyclohexyl amine, N,N-dimethyl aniline, N,N-dimethyl benzyl amine, N-methyl morpholine, N-methyl piperidine, and N-methyl pyrrolidine.

Other specific reagents suitable for use in introducing quaternary amine ether substituents are the halohydroxypropyl quaternary ammonium halides. These reagents may be obtained by reacting a hypohalous acid (e.g. hypochlorous or hypobromous acid) with an allyl quaternary ammonium halide salt formed by reacting an allyl halide (e.g. allyl chloride or bromide) with one of the above-listed tertiary amines. Additional examples of suitable etherifying agents of this type and more detailed procedures for preparing and using them for the introduction of quaternary amine substituents into starch are described in U.S. Pats. Nos. 2,876,217 and 3,346,567.

While any of the above amine etherifying treatments are suitable for use in preparing carboxyl starch amine ethers of the present invention, the preferred starch derivatives of the invention, by virtue of their improved binder properties, contain a quaternary amine (ammonium) ether substituent. The more preferred starches contain quaternary amine ether substituents of the structural formula

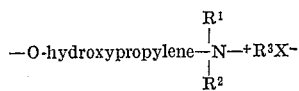

wherein $R^1$, $R^2$, $R^3$ and X are as described above, the substituents being introduced by reacting starch with a halohydroxypropyl quarternary ammonium halide. For example, starch is reacted with vic-chlorohydroxypropyl trimethyl ammonium chloride under alkaline etherifying conditions in accordance with the process of the above-described U.S. Pat. No. 3,346,567. Under such conditions the vic-halohydroxypropyl reacts to link the quaternary amine substituent to the starch molecule through an ethereal oxygen atom.

The starch employed as the starting starch in the preparation of the carboxyl starch amine ethers of the invention suitably may be any starch containing a sufficient number of reactive sites to allow its conversion to the desired carboxyl starch amine derivative. Suitable starches include unmodified starches derived from corn, potato, wheat, rice, tapioca, arrow-root, sorghum, waxy maize, and high amylose content native starches (containing at least 50% by weight pure amylose, dry solids basis), as well as modified starches (e.g. partially acid-hydrolyzed, enzyme-converted, heat-dextrinized starches) prepared therefrom. The starting starch, as stated, preferably is ungelatinized and granular in nature. Granular unmodified corn starch, due to its availability and relatively low cost, constitutes one preferred base starch. Unmodified (raw) potato and tapioca starches are other excellent base starches. These starches, and particularly potato starch, for example, provide ultimate carboxyl starch amine derivatives of higher binder strength and produce coatings of greater than usual gloss as compared to comparable derivatives produced from corn starch and waxy maize starch.

As stated, the carboxyl starch amine derivatives of the above-described type provide improved formulations when employed as at least a portion of the binder ingredient in paper coating compositions of the type comprising an aqueous dispersion of a pigment and a binder therefor, i.e. paper coating colors. As disclosed by Libby in Chapter 12, page 273 et seq. of Pulp and Paper Sciences and Technology, vol. II (McGraw-Hill 1962), conventional paper coating formulations of this type typically contain from about 3% to about 70% by weight total solids and from about 5 to about 25 parts by weight binder dry substance per 100 parts pigment dry solids. Such pigment and binder ingredient proportions similarly are suitable for use in the coating colors of the present invention.

The carboxyl starch amine ether suitably may be employed as the sole binder ingredient in the coating colors of the invention or may be used in combination with one or more of the conventional pigment binders such as a conventional unmodified, modified, or derivatized starch binder, casein, polyvinyl alcohol, a synthetic polymer latex (e.g. butadiene-styrene copolymers, ethylene-vinyl acetate copolymers, acrylate copolymers, and vinyl acetate polymers), and mixtures thereof.

Actual levels of carboxyl starch amine ether employed in particular formulations of the invention may vary over a wide range, depending in given instances upon, inter alia, the nature of the starch derivative and of the pigment employed and the properties desired of the resultant color and coating ultimately prepared therefrom. Generally, in order to obtain benefit from the improved pigment binder qualities of the carboxyl starch amine ether of the invention, the carboxyl starch amine ether should be present in amounts consistuting at least about 2 parts, more preferably at least about 5 parts by weight per 100 parts pigment in the formulation. Used as the sole pigment binder present, the carboxyl starch amine ethers typically provide excellent coatings at levels in the range of from 8% to about 16% by weight of the pigment content, dry substance basis. At the lower binder contents in this range, due to their higher relative binder strengths, starch derivatives of the invention derived from tapioca and potato starch, and in particular potato starch, are more preferred for use. Irrespective of the starch base of the derivatives, a particular feature of the present invention is that coating color binder levels can be reduced on the order of 20 to 30%, without sacrificing coating strength, compared to conventional starch binders such as ordinary oxidized starches.

Any inorganic or organic water-insoluble material employed as a pigment (also sometimes referred to as a filler) in conventional paper coating compositions also may be employed as the pigment ingredient in the coating compositions of the present invention. Such materials include clay (e.g. kaolin), talc, calcium carbonate, zinc oxide, barium oxide, titanium dioxide, zinc sulfide, diatomaceous sliica, blanc fixe, carbon black, calcium silicate, lithopone, yellow, brown, and red ochres, burnt umber, Venetian red, chrome yellow, cadmium yellow, Prussian blue, ultramarine, Hansa yellow, Hansa orange, phthalocyanine blue, and mixtures thereof.

Any batch or continuous technique employed for preparing conventional paper coating compositions suitably may be used in the preparation of those of the present invention. For example, the pigment, binder, and any additional solid adjuvants employed may be pre-mixed dry in a suitable blending apparatus, e.g. a ball mill, to provide a formulation which then can be dispersed in water for use. Alternatively, the ingredients employed separately or in various sub-combinations initially may be dispersed in the water and thereafter blended together to provide the desired color dispersion.

In the ultimate coating color, the starch derivative binder must be in gelatinized form. If the derivative employed is in pregelatinized form, it need only be dispersed in water and no special treatment is required. In instances where the carboxyl starch amine ether binder employed is in granular form, a slurry of it must be cooked and converted to a paste. Pasting of such granular starch derivatives suitably may be carried out before or after they have been combined with the pigment ingredients in the color formulation procedure. Where desirable, hydrolysis or modification of the starch binder may be carried outsimultaneously with such pasting treatments. As is known, this may be achieved by adding acid, enzymes, or even oxidizing agents to the starch coating slurry before cooking and/or using high temperatures, e.g. 212 to 350° F., and/or high shear in the pasting step. Any of these techniques are useful to effect an adjustment (lowering) of the final coating color viscosity during the starch cooking step. A particular feature of the present invention, however, is that such viscosity adjustment treatments, heretofore standard procedure when using certain starch binders, such as the cationic starches, may be eliminated completely. This is possible since the preferred carboxyl starch amines of the invention, i.e. oxidized starch amines, have viscosity properties closely corresponding to conventional oxidized starches and viscosity properties satisfactorily can be controlled by an adjustment of the carboxyl equivalent content of the derivatives and/or the pH of the oxidation treatment during their manufacture. Accordingly, all the coating color formulator need do when using them is mix and, where necessary, paste them.

In a formulation technique particularly preferred for use, the carboxyl starch amine ether employed is available in granular form, the granular starch derivative is pasted separately by heating it in water at temperatures in the range of 160°–212° F., and the resultant paste then is blended into a preformed aqueous pigment dispersion. Typical formulation procedures of this type employ an aqueous pigment dispersion (also referred to as a "slip") having a pigment concentration of about 70% by weight, an aqueous carboxyl starch amine ether paste having a concentration in the range of from about 20 to about 30% by weight, and a diluent water stream, the relative proportions of pigment, starch paste, and water streams employed depending, in particular embodiments, upon the total solids content and binder level desired in the final coating formulation.

In accordance with conventional practice, adjuvants commonly employed in paper coating colors including pigment dispersants (e.g. sodium hexametaphosphate), pH adjustment agents (e.g. sodium hydroxide or calcium chloride), soaps (e.g. sodium stearate), defoamers, preservatives, wet-rub improvement agents, and the like, also suitably may be employed alone or in combination in the paper coating compositions of the present invention.

Coating compositions may be prepared in accordance with the present invention for use in any conventional coating equipment. Colors of the invention containing up to 50% total solids, for example, may be produced for application by size press, calender stack, brush coater, knife-edge coater, air-knife coater, spread-shaft coater, or reverse-roll coater. Colors of 50 to 70% total solids can be produced for application by print-roll coaters and trailing-blade coaters. A particular feature of the present invention is that high total solids content colors, e.g. 60% solids and over, which are excellently adapted for high speed application by trailing-blade coaters, may be prepared thereby.

The invention having been described above in detail, the following examples are presented to show specific embodiments of the carboxyl starch amine ethers of the present invention, and, in addition, paper coating compositions and coated paper products prepared using such starch derivatives as pigment binders. Unless otherwise indicated, all percentages given are on a dry solids weight basis.

Example I

A 22.5° Bé. (60° F.) aqueous slurry of unmodified corn starch (0.07% anionic substituent content, calculated as carboxyl) was adjusted to a pH of 9–10 by an addition soda ash and then heated to about 90°–95° F. With stirring an aqueous 4.1 titer alkalinity sodium hypochlorite solution (2.7 gm. chlorine per 3.6 gm. sodium hydroxide) was then added in increments, the total added being sufficient to add about 4.3% chlorine based on the starch. During the sodium hypochlorite addition, the temperature of the system was maintained below about 130° F. The reaction was continued until a sample of the product displayed a viscosity of about 50 seconds as determined by pasting a 10% aqueous slurry of the sample at 180° F. for 10 minutes, cooling the paste to 127–128° F., and then measuring the time required for 60 ml. of the cooled paste to flow through a Saybolt Viscometer adapted with a Universal tip. The pH of the reaction mixture then was adjusted to about 5.0 with sulfuric acid, and the starch product was filtered, washed, and dried to 9.5–10.5% moisture, total weight basis. The resultant product was a granular carboxyl starch material having a carboxyl group equivalent content of about 0.8% (i.e. an anionic substituent D.S. of about 0.029).

About 600 gm. of the oxidized starch intermediate thus produced (herein designated Starch 1) then was slurried into about 700 ml. of water at room temperature. About 9.5 gm. sodium hydroxide were then dissolved in 75 ml. water, and, after the resultant solution was cooled to about 77° F., it was stirred into a solution of about 12 gm. of 3-chloro-2-hydroxypropyl trimethyl ammonium chloride. The resultant reagent solution then was slowly added to the initially prepared starch slurry while rapidly stirring the mixture. The reactant mixture was then stirred and maintained at about 110° F. in a water bath for about 24 hours. At the end of the reaction time period, the pH of the reaction medium was adjusted to about 5 with 6 N hydrochloric acid, and the solid product present was filtered, washed, and air-dried. The resultant product obtained (herein designated Starch A) was a granular starch derivative containing about 0.14% Kjeldahl nitrogen, indicating a quaternary amine ether substituent D.S. of about 0.016. Analysis indicated the anionic substituent content of the product was essentially unaffected by the amine etherification reaction.

The carboxyl starch amine ether thus produced gives a negative response to a test employed to establish whether it adsorbs Light Green SF dye, a test sometimes used to characterize a starch product as cationic. About 0.2 gm. of the carboxyl starch amine mixed in about 10 ml. of water containing ten drops of a 0.2% aqueous solution of Light Green SF dye and centrifuged yields a white starch layer with the dye remaining in the supernatant water layer.

A 55% total solids paper coating color was prepared by initially cooking an aqueous 22.2% slurry of Starch A on a steam bath for 30 minutes and then stirring about 141 parts of the resultant hot paste, along with about 11 parts water, into about 350 parts of a 70% solids clay slip prepared by dispersing a No. 2 coating clay, "HT predispersed clay," Minerals and Chemicals Phillips Co., in water containing 0.05% sodium hexametaphosphate. The clay in the blend remained dispersed and the dispersion's viscosity gradually increased throughout the addition of the starch derivative paste. The resultant formulation which contained about 12.8% Starch A, based on the pigment, was a stable, homogeneous dispersion.

A coating of the resultant color was applied to 45 lb. coating raw stock paper using a No. 10 wire-wound rod as an applicator and drying the coated sheets to equilibrium moisture conditions (24 hours) at 73° F. and 50% relative humidity. TAPPI methods were then employed to measure the wax pick, IGT (No. 4 ink at B spring setting), brightness, and opacity properties of the final sheets. The results of the tests, and those of comparable measurements carried out on control coated sheets prepared using colors containing Starch 1 as the binder at 12.8%, 14.4%, and 16% levels based on the clay content, are shown in Table 1 below.

TABLE 1

| Starch binder | Binder conc., percent of clay | Wax pick | IGT, ft./min. | Brightness | Opacity |
|---|---|---|---|---|---|
| Starch A | 12.8 | 7+ | 300 | 77.4 | 95.2 |
| Control (Starch 1) | 12.8 | 6 | 166 | 77.8 | 95.4 |
| Do | 14.4 | 7 | 233 | 77.6 | 94.4 |
| Do | 16.0 | 7 | 297 | 77.2 | 94.2 |

As seen from the wax pick and IGT data in Table 1, the pigment binder starch of the present invention, even at a binder level on the order of 20–25% less than that of the ordinary oxidized starch binder, advantageously produced a coating of comparable strength. The data further show the reduction in binder content caused no sacrifice to coating optical properties.

Example II

The general procedure of Example I was repeated to prepare another carboxyl starch amine ether from unmodified corn starch excepting, during the oxidation treatment to produce the carboxyl starch intermediate (herein designated Starch 2), (1) the total amount of 4.1 titer alkalinity hypochlorite solution (3.6 gm. chlorine per 4.88 gm. sodium hydroxide) employed corresponded to about 5.9% chlorine based on the starch, and (2) the temperature of the reaction mixture was maintained below about 110° F. during the incremental hyprochlorite solution addition. The oxidation reaction was allowed to continue until a test for the presence of bleach using potassium iodide indicated an exhaustion of chlorine.

The resultant material (designated Starch B) was a granular carboxyl starch derivative having a carboxyl equivalent content of about 1.4% and a Kjeldahl nitrogen content of about 0.14%, indicating an anionic substituent D.S. of about 0.050 and a quaternary amine ether substituent D.S. of about 0.016.

With regard to adsorbance of Light Green SF dye, the starch product has properties similar to the carboxyl starch amine ether of Example I.

A 55% total solids coating color containing about 12.8% Starch B based on pigment was prepared and paper was coated with the color according to the procedures of Example I. The properties of the resultant coated paper product obtained, along with those of control coatings prepared using Starch 2 as the binder at 12,8%, 14.4%, 16%, and 18% levels based on the pigment, are shown in Table 2.

TABLE 2

| Starch binder | Binder conc., percent of clay | Coating properties | | | |
|---|---|---|---|---|---|
| | | Wax pick | IGT, ft./min. | Brightness | Opacity |
| Starch B | 12.8 | 7+ | 415 | 77.5 | 93.6 |
| Control (Starch 2) | 12.8 | 6 | 200 | 77.8 | 94.0 |
| Do | 14.4 | 7 | 252 | 78.2 | 94.6 |
| Do | 16.0 | 7 | 287 | 77.6 | 93.7 |
| Do | 18.0 | 8 | 333 | 77.4 | 93.4 |

The data in Table 2 again demonstrate the superior pigment binding strength of the carboxyl starch amine ethers of the present invention as compared to ordinary carboxyl starches.

Example III

In order to compare the properties of the carboxyl starch amine ethers of the present invention with those of starch derivatives having an excess of amine ether substituent as compared to anionic substituent, the carboxyl starch amine ether preparation of Example II was repeated excepting, in the oxidation reaction (1) a 9.0 titer alkalinity solution of sodium hypochlorite (1.6 gm. chlorine per 2.4 gm. sodium hydroxide) was employed; and (2) the total amount of chlorine added via the 9.0 titer hypochlorite solution was about 3% based on the starch. The resultant carboxyl starch amine ether had a carboxyl equivalent content of about 0.3% (i.e., an anionic substituent D.S. of about 0.011) and a nitrogen content of about 0.128% (i.e., a quaternary amine ether substituent D.S. of about 0.0148). The starch derivative (designated Starch C) adsorbs Light Green SF dye.

A 55% solids coating color containing Starch C at a 12.8% level based on the clay was prepared as in Example I. When the paste of Starch C was added to the clay slip during formulation of the color, the viscosity of the clay dispersion rapidly rose, indicating the starch caused flocculation of the clay particles, i.e. that shock had occurred. After starch addition was completed, mixing was continued for two hours. The viscosity of the resultant color was measured (77° F.) using a Brookfield Model RVT viscometer, No. 6 spindle, run at each 20 r.p.m. and 100 r.p.m. Paper was coated with the color and tested for strength as in Example I. The results of those tests are listed in Table 3. Corresponding properties of the colors and coatings formed using the carboxyl starch amine ethers of Examples I and II are also listed for comparison purposes.

TABLE 3

| | Starch binder, D.S. | | Coating color, Brookfield viscosity, cps.[1] | | Coating properties | |
|---|---|---|---|---|---|---|
| | Anionic subst. | Amine ether subst. | 20 r.p.m. | 100 r.p.m. | Wax pick | IGT, ft./min. |
| Starch C (Example III) | 0.011 | 0.0148 | 21,750 | 8,350 | 8 | 312 |
| Starch A (Example I) | 0.029 | 0.016 | 4,050 | 1,860 | 7+ | 300 |
| Starch B (Example II) | 0.050 | 0.016 | 2,150 | 1,050 | 7+ | 415 |

[1] No. 4 spindle for viscosities below 5,000 cps.; No. 6 for those above 5,000 cps.

The data shown in Table 3 demonstrate that the carboxyl starch amine ethers of the invention are significantly more compatible with coating color pigments than starch amines having a molar ratio of anionic substituent (carboxyl)-to-amine ether substituent of less than 1:1. The data further indicate that the pigment binding strength of the carboxyl starch amine ethers of the present invention increases at given amine ether substituent levels with increasing anionic (carboxyl) substituent levels. The latter is unexpected, as can be seen more clearly from Table 4 below in which are listed the strengths of coatings prepared using control colors of 55% total solids containing hypochlorite-oxidized corn starches (amine substituent-free) having carboxyl equivalent contents of 0.8%, 0.9%, and 1.4% at loadings of 16.0% and 18.0% based on the clay content, which loadings are conventional for ordinary oxidized starch pigment binders.

TABLE 4

| Oxidized starch binder (amine substituent D.S.=0) | | | Binder concentration, percent of clay | |
|---|---|---|---|---|
| | Carboxyl equivalent content, percent by wt. | Anionic subst., D.S. | 16 | 18 |
| | | | Coating IGT (ft./min.) | |
| Starch 1 (Example I) | 0.8 | 0.029 | 297 | 405 |
| Starch 3 (Example III) | 0.9 | 0.032 | 300 | 368 |
| Starch 2 (Example II) | 1.4 | 0.050 | 287 | 333 |

Starch 3 listed in Table 4 was prepared from unmodified cord starch by repeating the oxidation treatment employed to make Starch C above, excepting (1) the hypochlorite solution of 9.0 titer alkalinity was added incrementally to deliver a total of about 5.5% chlorine based on the starch, (2) the temperature of the reaction mixture was maintained in the range of from about 108–112° F. throughout the reaction period, (3) hypochlorite reagent addition was interrupted for about one hour after addition of about one-half of the total employed, and (4) the reaction mixture was reacted for about 2.5 hours after reagent addition was resumed, the pH of the medium being maintained above 8.5 during the last hour by addition of soda ash.

Example IV

A series of carboxyl starch amine ethers of the invention having an amine ether substituent D.S. of about 0.028 and varying carboxyl equivalent contents was prepared by using additional samples of oxidized Starches 1, 2, and 3 described above in Examples I, II, III, respectively, as intermediates and etherifying each one according to the procedure of Example I, excepting about 21.6 gm. of 3-chloro-2-hydroxypropyl trimethyl ammonium chloride and about 11.5 gm. sodium hydroxide were employed. The resultant granular carboxyl starch amine ethers had the compositions shown in Table 5 below. As in Example I, 55% solids coating colors, containing each 12.8% and 14.4% starch based on the clay, were prepared separately from the starches so produced and paper sheets were coated using the respective colors. The properties of the coatings are listed in Table 5.

TABLE 5

| Starch binder | Carboxyl equivalent content, percent by wt. | Anionic subst., D.S. | Nitrogen content, percent by wt. | Amine ether subst., D.S. | Binder conc., percent of clay | | | |
|---|---|---|---|---|---|---|---|---|
| | | | | | 12.8 | | 14.4 | |
| | | | | | Coating properties | | | |
| | | | | | Wax pick | IGT., ft./min. | Wax pick | IGT., ft./min. |
| Starch D | 0.8 | 0.029 | 0.24 | 0.028 | 8 | 377 | 9 | 375 |
| Starch E | 0.9 | 0.032 | 0.246 | 0.029 | 7+ | 380 | 9 | 450 |
| Starch F | 1.4 | 0.050 | 0.246 | 0.029 | 9 | 490 | 8+ | 515 |

The data in Table 5 further demonstrate the excellent pigment binder properties of the starch amine ethers of the invention. The data also manifest again the surprising characteristic of the carboxyl starch amine ethers of the invention to demonstrate increased binder strength with increasing anionic substituent (carboxyl) content.

Example V

Another carboxyl starch amine ether of the invention was prepared from unmodified corn starch by employing oxidized Starch 3 described in Example III as the intermediate and etherifying it according to the procedure of Example I excepting using 32.5 gm. and 14.5 gm. of 3-chloro-2-hydroxypropyl trimethyl ammonium chloride and sodium hydroxide, respectively.

The resultant granular product produced (Starch G) had a carboxyl equivalent content of about 1.4% (i.e. an anionic substituent D.S. of about 0.050) and a Kjeldahl nitrogen content of about 0.31% (i.e. a quaternary amine ether substituent D.S. of about 0.036). The starch does not adsorb Light Green SF dye to a greater extent than the corresponding oxidized starch intermediate from which it is produced. Using the procedure of Example I, a 55% total solids coating color was prepared using Starch G at a 12.8% binder level based on the clay. Color preparation was carried out without shock effects being observed. As in the preceding examples, paper was coated with the colors. The coating obtained had strength characteristics corresponding to a wax pick of 8 and an IGT reading (No. 4 ink and B spring setting) of 460 ft./min.

Example VI

Another carboxyl corn starch amine ether of the invention was prepared by again using a sample of oxidized Starch 3 (Example IV) as an intermediate and etherifying it by the procedure of Example I, excepting using 40.5 gm. of 3-chloro-2-hydroxypropyl trimethyl ammonium chloride and 16.2 gm. sodium hydroxide.

The resultant granular starch product (Starch H) had a carboxyl equivalent content of about 1.4% (i.e. an anionic substituent D.S. of about 0.050) and a Kjeldahl nitrogen content of about 0.34% (i.e. an amine ether substituent D.S. of about 0.040).

The starch product responds to Light Green SF dye adsorption similar to the starch derivatives of the present invention of Examples I, II, and IV.

Following the procedure of Example I, a 55% total solids coating color was prepared using Starch H at a 12.8% level based on the clay content. Formulation of the color was without shock effect. Paper was coated with the color and tested for strength as in preceding examples. The resultant coating had a wax pick of 8 and in the IGT test gave a reading of about 457 ft./min.

Example VII

This example illustrates an embodiment of the carboxyl starch amine ethers of the invention derived from tapioca starch. It further illustrates a preparation wherein anionic (carboxyl) substituent is introduced after the starch amine ether intermediate is made.

A solution of about 55 gm. 3-chloro-2-hydropropyl trimethyl ammonium chloride in 250 ml. of water was blended with a solution of 25 gm. sodium hydroxide in 250 ml. of water, and the resultant mixture was cooled to about 80° F. The mixture was then added with stirring to a slurry of about 1110 gm. (1000 gm. dry substance) of unmodified tapioca starch in about 1500 ml. water. The pH of the resultant mixture was adjusted to about 11.5, and the mixture was then placed on a water bath maintained at about 110° F. and allowed to react at this temperature for about 24 hours. The pH of the mixture was then adjusted to about 5.1 with 0.33 N hydrochloric acid, and the starch material present was filtered, washed with water, and air dried. Analysis revealed the product produced with a granular starch derivative having a Kjeldahl nitrogen content of about 0.3%.

900 gm. of the starch material thus produced was then slurried in 800 ml. water, and the pH was adjusted to about 10.1 by an addition of soda ash. The slurry was placed on a water bath maintained at about 108–110° F. and about 40.8 gm. chlorine (as 408 ml. of 4.1 titer alkalinity sodium hypochlorite solution) were added. The resultant mixture was held over the water bath and allowed to react for about 2 hours. When a test with potassium iodide indicated substantially all of the bleach was exhausted, the reaction mixture was removed from the bath and its pH was adjusted to about 5.0 with dilute sulfuric acid. The starch material present was filtered out, washed with water, and air dried. The resultant product obtained was a granular starch derivative (Starch I) having a carboxyl equivalent content of about 1.05% (i.e. an anionic substituent D.S. of about 0.038) and a Kjeldahl nitrogen content of about 0.25% (i.e. an amine ether substituent D.S. of about 0.029).

With the procedure of Example I, 55% total solids coating colors were produced using Starch I at each 12%, 14%, and 16% level based on clay content. During formulation of the colors, no shock effects were observed. Paper sheets were coated as in Example I with each of the resultant colors. The properties of the coatings are listed in Table 6.

TABLE 6

| Starch binder | Starch binder conc., percent of clay | Coating properties | |
|---|---|---|---|
| | | Wax pick | IGT |
| Starch I | 12 | 8 | 370 |
| Do | 14 | 9 | 470 |
| Do | 16 | 10 | 510 |

Example VII

This example illustrates an other embodiment of the carboxyl starch amine ethers of the invention based on tapioca starch.

A solution of 75 gm. of 3-chloro-2-hydroxypropyl trimethyl ammonium chloride in 300 ml. water was blended with a solution of 35 gm. of sodium hydroxide in 300 ml. water and the blend was cooled to about 80° F. This solution was then stirred into a slurry of 2780 gm. (2500 gm. dry substance) of unmodified tapioca starch in 3850 ml. water. The pH of the resultant mixture was about 11.5. The mixture was then placed on a water bath maintained at about 110° F. and allowed to react at this temperature for about 24 hours. The mixture was then removed from the bath, 0.33 N hydrochloric acid was added to adjust the pH to about 5.0, and the starch material present was filtered, washed, and air-dried.

About 1780 gm. (1000 gm. dry substance) of the starch product so produced was then slurried in 950 ml. water, and the pH of the slurry was adjusted to about 9.9 by an addition of soda ash. The slurry was heated on a water bath at 110° F., and 25 gm. chlorine (as 240 ml. of 4.5 titer sodium hydrochlorite solution) was added. The resultant mixture was held on the water bath and allowed to react for about 2.5 hours, after which period a test with potassium iodide indicated substantial exhaustion of bleach. The pH of the medium was adjusted to about 5.8 with dilute sulfuric acid and the starch was filtered out, washed, and air-dried.

The resultant product (Starch J) was a granular starch derivative having a carboxyl equivalent content of about 0.59% (i.e. an anionic substituent D.S. of about 0.022) and a Kjeldahl content of about 0.157% (i.e., an amine ether substituent D.S. of about 0.018).

Following the general procedure of Example I, 60% total solids coating colors were prepared using Starch J at levels of 14, 16, 18% based on the clay content. During formulation of the colors no shock effects were noticeable.

The resultant colors were then coated on 45 lb. coating raw stock using a laboratory trailing-blade coater equipped with a spring steel trailing-blade having a 1.5-inch blade exposure and adjusted to show a small deflection of the blade when running. The coater was operated with a color puddle depth of about 0.5 in. Coated web was dried and equilibrated as to moisture content as in Example I. Samples having 3–3.5lb. coat weight per ream were tested for wax pick and IGT properties as in the preceding examples. The characteristics of the colors and coatings obtained are set forth in Table 7 below. For comparison purposes, the properties of control colors and coatings prepared therefrom using, as the starch binder, an oxidized tapioca starch (Starch 4) having a carboxyl equivalent content of about 0.57% but being free of amine ether substituents are also listed in Table 7.

TABLE 7

| Starch binder | Coating color | | | Coating properties | |
|---|---|---|---|---|---|
| | Binder conc., percent of clay | Brookfield viscosity (77° F.), cps.[1] | | Wax pick | IGT, ft./min. |
| | | 20 r.p.m. | 100 r.p.m. | | |
| Control (Starch 4) | 14 | 4,500 | 1,655 | 9 | 265 |
| Do | 16 | 10,700 | 4,000 | 10 | 310 |
| Do | 18 | 15,200 | 5,840 | 10 | 325 |
| Starch J | 14 | 22,600 | 9,680 | 10 | 310 |
| Do | 16 | 23,000 | 10,120 | 11 | 373 |
| Do | 18 | 31,000 | 13,280 | 12 | 400 |

[1] No. 4 spindle for viscosities below 5,000 cps.; No. 6 spindle for viscosities above 5,000 cps.

The data listed in Table 7 again manifest the improved pigment binding strength of the carboxyl starch amine ethers of the invention and further demonstrate not only that these products do not have the undesirable shock properties of the starches generally known as "cationic," but that these new products, even at relatively low binder levels, still are able to produce colors which have sufficiently high viscosities to be adapted for use in coating equipment, e.g. trailing blade coaters, which operate more efficiently using high solids colors having relatively high viscosities.

Example IX

This example illustrates an embodiment of the carboxyl starch amine ethers of the invention produced from potato starch.

A solution of about 112 gm. of 3-chloro-2-hydroxypropyl trimethyl ammonium chloride in 560 ml. of water and a solution of about 40.5 gm. of sodium hydroxide in 440 ml. of water were blended together. This solution was then added with stirring to a slurry of about 2940 gm. (2500 gm. dry solution) of unmodified potato starch in 3500 ml. of water. The pH of the resultant mixture was then adjusted to about 11.5 by an addition of 3% sodium hydroxide solution. The mixture was then placed on a water bath maintained at about 110° F. and allowed to react for about 22.5 hours. At the end of this period the mixture was removed from the bath and its pH was adjusted to about 5.0 with 0.33 N hydrochloric acid. The starch material present then was filtered out, washed, and air dried. Analysis showed it had a Kjeldahl nitrogen content of about 0.28%.

About 1170 gm. (1000 gm. dry solution) of the resultant product was slurried in 1600 ml. of water and the pH of the slurry was raised to about 10.2 by an addition of about 155 ml. of an aqueous 16.6% soda ash solution. The mixture was then placed in a water bath maintained at about 110° F. and 35 gm. of chlorine (as 350 ml. of 3.7 titer alkalinity sodium hypochlorite solution) were added. The resultant mixture was held on the water bath and allowed to react for about 2.5 hours. At the end of this period, the mixture was removed from the bath, 1.0 gm. of sodium bisulfite was added to remove any residual bleach, and the pH was adjusted to about 6.0 with aqueous 10% sulfuric acid. The starch material present was then filtered out, washed, and air-dried.

The resultant product (Starch K) was a granular starch derivative having a carboxylic equivalent content of about 1.03% (i.e. an anionic substituent D.S. of about 0.037) and a Kjeldahl nitrogen content of about 0.25% (i.e. an amine ether substituent D.S. of about 0.029). 55% coating colors were prepared, as described in Example I, using the potato derivative thus produced as the binder at levels of about 10, 12, 14, and 16% based on the clay content of the dispersion. Formulation of the colors was without any noticeable shock effects. Coated paper was produced using the resultant colors in a trailing-blade coater as described in Example VIII. The properties of the colors and coatings are shown in Table 8 below. For comparison purposes, the properties of control colors and coatings produced therefrom containing an oxidized potato starch (Starch 5) having a carboxyl equivalent content of about 1.08% but being free of amine ether substituents are also shown.

TABLE 8

| Starch binder | Color | | | Coating properties | |
|---|---|---|---|---|---|
| | Binder conc., percent of clay | Brookfield viscosity (77° F., No. 4 Spindle), cps. | | Wax pick | IGT, ft./min. |
| | | 20 r.p.m. | 100 r.p.m. | | |
| Control (Starch 5) | 10 | 1,090 | 420 | 9 | 230 |
| Do | 12 | 1,400 | 556 | 10 | 280 |
| Do | 14 | 2,010 | 866 | 10 | 340 |
| Do | 16 | 3,660 | 1,396 | 11 | 390 |
| Starch K | 10 | 825 | 392 | 12 | 375 |
| Do | 12 | 975 | 486 | 12 | 410 |
| Do | 14 | 1,420 | 702 | 13 | 450 |
| Do | 16 | 1,620 | 824 | 13 | 490 |

The data in Table 8 taken with that appearing in the preceding examples indicate the superior pigment binding properties of the carboxyl starch amine derivatives of the invention derived from potato starch as compared with corn and tapioca.

Example X

To further illustrate the effect on starch properties of the molar ratio of anionic substituent to amine ether substituent in the carboxyl starch amine ethers, the starch preparation of Example IX was repeated using another sample of the unmodified potato starch as the starting starch material excepting, in the oxidation treatment of the starch amine intermediate, about 240 ml. of 4.5 titer sodium hypochlorite solution (containing a total of 2.5% chlorine based on the starch) was employed. The product produced (Starch L) was a granular starch material having a total anionic substituent content, calculated as carboxyl, of about 0.73% (i.e. an anionic substituent D.S. of about 0.026) and a Kjeldahl nitrogen content of about 0.26% (i.e. an amine ether substituent D.S. of about 0.029). Using the procedure of Example I, an attempt was made to prepare a 55% total solids coating color containing about 16% of Starch L based on clay content. During formulation of the color the viscosity of the clay dispersion increased quite considerably and on standing it completely gelled.

A comparison of the results of this run with those of Example IX again demonstrates the surprising and advantageous properties of the carboxyl starch amine ethers of the invention.

Example XI

The procedure of Example IX was repeated to prepare two additional carboxyl starch amine derivatives from unmodified potato starch excepting (1) in the preparation of the starch amine either intermediate 68.5 gm. and 90 gm. of 3-chloro-2-hydroxypropyl trimethyl ammonium chloride were employed, respectively, the amount of sodium hydroxide added with the etherification being 32 and 42 gm., respectively; and (2) in the oxidation of each of the starch intermediates so produced about 35 gm. chlorine (added as 350 ml. of 3.7 titer alkalinity sodium hypochlorite solution) were employed. The resultant products, designated here Starch M and N respectively, were granular products having the following compositions:

| | Calc. COOH cont., percent by wt. | Anionic subst., D.S. | Nitrogen cont., percent by wt. | Amine ether subst. D.S. |
|---|---|---|---|---|
| Starch M | 1.13 | 0.041 | 0.146 | 0.017 |
| Starch N | 1.13 | 0.041 | 0.192 | 0.022 |

Following the procedure of Example I, 55% total solids coating colors were prepared using each of the starch derivatives at 10, 12, 14, and 16% levels based on the clay content. Paper then was coated with the respective colors on the trailing-blade coater and tested, as in Example IX. The properties of the resultant coatings are shown in Table 9 below.

TABLE 9

| Starch binder | Binder conc., percent of clay | Coating properties | |
|---|---|---|---|
| | | Wax pick | IGT, ft./min. |
| Starch M | 10 | 12 | 390 |
| Do | 12 | 12 | 410 |
| Do | 14 | 12 | 435 |
| Do | 16 | 13 | 460 |
| Starch N | 10 | 12 | 370 |
| Do | 12 | 12 | 400 |
| Do | 14 | 12 | 430 |
| Do | 16 | 13 | 460 |

The data listed in Table 9 again demonstrate the excellent pigment binder strength of the carboxyl starch amine ethers of the invention and, when compared with the results shown in the preceeding examples, further show the superiority, in terms of binding power, of the carboxyl amine ether derivatives of the invention derived from potato starch.

Example XII

Additional embodiments of the carboxyl starch amine ethers of the invention are prepared by using samples of Starch (Example I) as an intermediate in several runs and etherifying the intermediates using the procedure of Example I except for replacing the 3-chloro-2-hydroxypropyl trimethyl ammonium chloride etherifying reagent with equimolar amounts (about 0.064 mole) of the following:

3-chloro-2-hydroxypropyl tri-n-butyl ammonium chloride
3-chloro-2-hydroxypropyl dimethyl benzyl ammonium chloride
3-chloro-2-hydroxypropyl dimethyl cyclohexyl ammonium chloride
3-chloro-2-hydroxypropyl dimethyl phenyl ammonium chloride
3-chloro-2-hydroxypropyl methyl morpholinyl ammonium chloride
3-chloro-2-hydroxypropyl methyl piperidinyl ammonium chloride
3-chloro-2-hydroxypropyl methyl pyrrolidinyl ammonium chloride The resultant granular starch products have Light Green SF dye adsorption properties and pigment binding properties similar to the carboxyl starch amine ethers of the present invention of the preceding examples.

Example XIII

Additional embodiments of the carboxyl starch amine ethers of the invention are prepared by employing additional samples of Starch 1 (Example I) as an intermediate in several runs and etherifying the intermediate using the general procedure of Example I and replacing the 3-chloro-2-hydroxypropyl trimethyl ammonium chloride etherifying reagent with equimolar amounts (about 0.064 mole) of each of the following:

beta-diethylamino ethyl chloride
beta-dimethylamino isopropyl chloride
beta-dimethylamino ethyl chloride
3-dibutylamino-1,2-epoxy-propane
N-(2,3-epoxypropyl)-piperidine
N,N-(2,3-epoxypropyl) methyl aniline The resultant granular starch products have Light Green SF dye adsorption properties and pigment binding strength similar to the carboxy starch amine ethers of the present invention described in the preceding examples.

Further embodiments of this invention which do not depart from the spirit and scope thereof, of course, will be apparent to those skilled in the art; accordingly, the foregoing is to be interpreted as illustrative only and the invention will be understood to be limited only by the scope of the appended claims.

What is claimed is:

1. A paper coating composition comprising an aqueous dispersion of a pigment and a binder for said pigment, at least a portion of said binder being a carboxyl starch amine ether selected from the group consisting of carboxyl starch ethers containing tertiary amine ether groups and carboxyl starch ethers containing quaternary amine ether groups, said starch amine ether having an anionic substituent-to-amine ether substituent molar ratio of at least 1:1 and having amine ether substituent degree of substitution in the range of from about 0.0075 to about 0.05, the total solids content of said aqueous dispersion being in the range of from about 3 to about 70% by weight, the amount of said binder being in the range of from about 5 to about 25 parts per 100 parts by weight of said pigment, dry substance basis, and the amount of said carboxyl starch amine ether being at least about 2 parts per 100 parts by weight of said pigment, dry substance basis.

2. The coating composition according to claim 1 wherein the total solids content of said aqueous dispersion is at least about 50% by weight.

3. The coating composition of claim 1 wherein said carboxyl starch amine ether has a carboxyl equivalent content in the range of from about 0.3% to about 3% by weight, dry substance basis.

4. The coating composition according to claim 3 wherein said carboxyl starch amine ether is a hypochlorite-oxidized starch amine ether having a carboxyl equivalent content in the range of from about 0.3% to amount 1.5% by weight, dry substance basis.

5. The coating composition according to claim 4 wherein said carboxyl starch amine ether is a granular hypochlorite-oxidized corn starch amine ether.

6. The coating composition according to claim 4 wherein said carboxyl starch amine ether is a granular hypochlorite-oxidized potato starch amine ether.

7. The coating composition according to claim 4 wherein said carboxyl starch amine ether is a granular hypochlorite-oxidized tapioca starch amine ether.

8. The coating composition according to claim 4 wherein said carboxyl starch amine ether is a carboxyl starch amine ether containing quaternary amine ether groups and having a carboxyl equivalent content in the range of from about 0.3% to about 3% by weight, dry substance basis.

9. The coating composition according to claim 8 wherein said carboxyl starch amine ether is a hypochlorite-oxidized starch amine ether having a carboxyl equivalent content in the range of from about 0.3% to about 1.5% by weight, dry substance basis.

10. The coating composition according to claim 9 wherein said carboxyl starch amine ether is a hypochlorite-oxidized corn starch amine ether having a hydropropyl trimethyl ammonium chloride ether substituent degree of substitution in the range of from about 0.01 to about 0.035.

11. The coating composition according to claim 9 wherein said carboxyl starch amine ether is a hypochlorite-oxidized potato starch amine ether having a hydroxypropyl trimethyl ammonium chloride ether substituent degree of substitution in the range of from about 0.01 to about 0.035.

12. The coating composition according to claim 9 wherein said carboxyl starch amine ether is a hypochlorite-oxidized tapioca starch amine ether, having a hydroxypropyl trimethyl ammonium chloride ether substituent degree of substitution in the range of from about 0.01 to about 0.035.

13. A method for preparing a coated paper product which comprises applying to at least one surface of a paper web a coating composition comprising an aqueous dispersion of a pigment and a binder for said pigment, said dispersion having a total solids content in the range of from about 3 to about 70% by weight and a binder content, on a dry substance basis, in the range of from about 5 to about 25 parts of binder per 100 parts by weight of said pigment, including at least about 2 parts per 100 parts by weight of a carboxyl starch amine ether selected from the group consisting of carboxyl starch ethers containing tertiary amine ether groups and carboxyl starch ethers containing quaternary amine ether groups, said starch amine ether having an anionic substituent-to-amine ether substituent ratio of at least 1:1 and having an amine ether substituent degree of substitution in the range of from about 0.0075 to about 0.05 and thereafter subjecting the resultant coated web to a drying treatment.

14. A paper product having a surface coating of a mixture comprising a pigment and a binder for said pigment present in the range of from about 5 to about 25 parts of binder per 100 parts by weight of said pigment, dry substance basis, including at least about two parts per 100 parts by weight of a carboxyl starch amine ether selected from the group consisting of carboxyl starch ethers containing tertiary amine ether groups and carboxyl starch ethers containing quaternary amine ether groups, said starch amine ether having an anionic substituent-to-amine ether substituent ratio of at least 1:1 and having an amine ether substituent degree of substitution in the range of from about 0.0075 to about 0.05.

References Cited
UNITED STATES PATENTS

| | | | |
|---|---|---|---|
| 2,813,093 | 11/1957 | Caldwell et al. | 260—233.3 |
| 3,052,561 | 9/1962 | Kronfeld | 106—213 |
| 3,251,826 | 5/1966 | Mehltretter | 117—156X |
| 3,320,080 | 5/1967 | Mazzarella et al. | 106—210 |

LORENZO B. HAYES, Primary Examiner

U.S. Cl. X.R.

106—213; 117—156, 165

UNITED STATES PATENT OFFICE
CERTIFICATE OF CORRECTION

Patent No. 3,598,623                                  Dated August 10, 1971

Inventor(s) Robert M. Powers and Roland W. Best

It is certified that error appears in the above-identified patent and that said Letters Patent are hereby corrected as shown below:

Column 2, line 53, for "satisfacotry" read ---satisfactory---.
Column 2, line 59, for "capble" read ---capable---.
Column 3, line 36, for "R2 and R3" read ---$R^2$ and $R^3$---.
Column 6, line 48, for "either" read ---ether---.
Column 8, line 21, for "consistuting" read ---constituting---.
Column 8, line 44, for "sliica" read ---silica---.
Column 8, line 71, for "outsimultaneously" read ---out simultaneously---.
Column 11, line 46, for "12,8%" read ---12.8%---.
Column 12, line 63, for "cord starch" read ---corn starch---.
Column 13, line 71, for "0.34%" read ---0.345%---.
Column 14, line 41, for "with" read ---was---.
Column 14, line 49, for "over" read ---on---.
Column 15, line 1, for "VII" read ---VIII---.
Column 15, line 2, for "an other" read ---another---.
Column 15, line 33, for "Kjeldahl content" read ---Kjeldahl nitrogen content-
Column 17, line 23, for "either" read ---ether---.
Column 17, line 74, for "preceeding" read ---preceding.
Column 18, line 6, for "Starch (Example I) read ---Starch 1 (Example I)---.
Column 19, line 11, for "amount 1.5%" read ---about 1.5%---.
Column 19, bridging lines 35 and 36 for "hydropropyl" read ---hydroxypropyl---

Signed and sealed this 21st day of March 1972.

(SEAL)
Attest:

EDWARD M. FLETCHER, JR.                         ROBERT GOTTSCHALK
Attesting Officer                                Commissioner of Patents